United States Patent Office 2,857,235
Patented Oct. 21, 1958

2,857,235
PROCESS OF DYEING WOOL WITH VAT DYES

Salvatore G. Coscia, Philadelphia, Pa., assignor to the United States of America as represented by the Secretary of the Army No Drawing. Application July 19, 1954
Serial No. 444,409

8 Claims. (Cl. 8—36)

(Granted under Title 35, U. S. Code (1952), sec. 266)

The invention described herein, if patented, may be manufactured and used by or for the Government for governmental purposes, without the payment to me of any royalty thereon.

This application is a continuation-in-part of my co-pending application Serial No. 276,709, filed March 14, 1952, now abandoned.

This invention relates to processes for dyeing wool fibers with vat dyes, particularly of the anthraquinone type, and is adapted to continuous processes although not necessarily limited thereto.

Vat dyes of the anthraquinone type have been used for a long time for dyeing wool. The customary way of applying such dye is to reduce it to the leuco form with a reducing agent, such as sodium hydrosulfite, for rendering the dye water-soluble, contacting the wool with an aqueous solution of the leuco form of the dye by immersion or padding, and then oxidizing the absorbed dye group in an acidic solution which brings out its color.

Anthraquinone vat dyes, even in the leuco form, are not very soluble in water. Processes have been known for increasing the solubility of the leuco form of anthraquinone vat dyes in water by providing a mildly alkaline medium, as for instance in U. S. Patent No. 2,318,133, Wentz, assigned to E. I. duPont de Nemours & Company. In another recent patent, U. S. Patent No. 2,508,203, Weber, assigned to Allied Chemical & Dye Corporation, there is disclosed a process for dyeing wool with anthraquinone vat dyestuffs at a colorimetrically determined pH between about 12 and about 13 at a dyeing time from 15 to 60 minutes. However, the specification states that the pH of the bath is determined colorimetrically by observing a faint orange color on Clayton yellow or thiazole yellow test paper, which color change I have found to correspond to a pH of 12.25±.05 pH on a Beckman Type E glass electrode pH meter. While the specification of the Weber patent, which is based on an application filed August 16, 1948, states that glass electrode pH meters are unreliable, greatly improved models are now available, and an affidavit in the file of the Weber patent confirms that the pH of Weber's dye baths does not exceed pH 12.5, when electrometrically determined. This interpretation of the disclosure of the Weber patent is further buttressed by the length of dye bath treatment contemplated by Weber, i. e. 15 minutes or more, which at an electrometrically determined pH substantially above 12.5, e. g., at pH 12.8 or 13, is detrimental to the wool. Thus, the disclosures of the prior art, as well as the opinion of the experts in the dyeing field, has been that the alkalinity in the dyeing bath must not exceed pH 12 or at most 12.5 (when determined electrometrically), in order to avoid damage to the wool.

I have surprisingly found that the alkalinity of the vat dye bath can be substantially increased, to the order of about pH 12.8–13.1, electrometrically determined, provided temperature conditions of the bath and the time of contact of the wool with the alkaline liquid are carefully regulated within certain limits. At such more highly alkaline pH values, a very substantial increase of the affinity of the wool for the dye takes place, which results in very substantial savings of dyestuffs; and yet, if the temperature and time conditions of the present invention are observed, the fiber damage to wool is either absent or so negligible as to have no adverse effect on its commercial acceptability. It is important to neutralize the wool fibers immediately after contact with the alkaline leuco dye solution so that the time values discovered by me are not exceeded.

Thanks to the surprising increase in the affinity of the wool for the dye at the higher pH values contemplated by the present invention, it is possible to obtain a deep shade as a result of such short periods of exposure, i. e. 10 seconds or less to about 1 minute, without damaging the wool structure. However, if the time of exposure substantially exceeds 1 minute, the wool fibers suffer substantial damage by alkali etching. At pH 12.9±.1, a contact time of 20–40 seconds is generally preferred, while at pH 13.1 about 10 seconds are advisable.

Careful adjustment of the temperature conditions of the dye bath during contact with the wool is also required. If the temperature substantially exceeds 160° F., the reaction is speeded up to a degree which causes substantial wool fiber damage. On the other hand, if the temperature is substantially below 120° F., the absorption of the leuco dye by the wool fiber is undesirably slow, and does not yield the desired shade during the permissible time of contact of the wool with the alkaline bath which, as stated above, should not substantially exceed 1 minute.

My process may be practiced in a continuous form by continuously returning the spent dye bath to a replenishment tank to which is continuously added a re-supply of vat dye, and the pH is continuously adjusted to a predetermined alkaline value within the range of about 12.8–13.1.

A principal feature of my invention is thus a careful balancing of the pH value against temperature and time conditions. Particularly in the higher pH ranges, say 13.0 to 13.1, at which range the affinity of the wool fiber for the dye is most pronounced, the time of contact between wool fiber and alkaline bath should be below the recommended upper limit of 160° F., for instance at about 120–155° F.

While no hard and fast conditions of treatment can be laid down, owing to the immense number of possibilities of variations of dye baths of the numerous anthraquinone dyes and mixtures thereof, it can be generally stated that the higher the pH of the bath, the lower should be its temperature and/or the time of contact between bath and wool. It should be remembered that the pH scale of alkalinity measurements is based on the logarithmic scale of hydrogen and hydroxyl ion concentrations. Thus, a dye bath having a pH of 12.8 has an alkalinity (in terms of hydroxyl ion concentration) of .063 normal, which is about twice as much as the hydroxyl ion concentration of a bath having pH 12.5 (.032 normal). A bath of pH 13 has a hydroxyl ion concentration of .1 normal, which is about 3 times the hydroxyl concentration of a dye bath at pH 12.5, which heretofore was considered by the art to be the upper limit of alkalinity in the dyeing of wool with anthraquinone vat dyes.

For the purpose of the present invention, it is best to dye the wool in the form of tops, which is a loose collection of parallel combed wool fibers formed into a sliver. While I do not wish to be understood to exclude the dyeing of woven wool fabrics from the scope of my invention, I nevertheless feel it appropriate to point out that at the short contact time which is an essential feature of my invention, the results of dyeing of wool in the form of tightly woven fabric might tend toward poor penetration. For obtaining the full measure of the benefits to be derived from my invention, I therefore recommend that the wool at the time of dyeing be in loose fibrous form, for instance in the form of "worsted" wool tops. The invention can also be advantageously practiced when the wool is in the form of threads or yarns, preferably not too tightly twisted. Unevenness of dyeing can be corrected by blending prior to weaving; this, of course applies also to dyed tops, which can be blended into a mass of homogeneous color appearance prior to being made into yarns.

I generally find it unnecessary to apply a protective agent to the wool. However, especially at or near the upper limit of the pH range contemplated by the present invention, i. e. at pH of about 13–13.1, the wool may benefit by the employment of a protective agent, for example ethylene dibromide or formaldehyde or glyoxal; the wool may be contacted with the protective agent at the point of or prior to the contact with the dye bath.

The dyeing bath which converts the leuco dye into the intended color may, in the practice of my invention, simultaneously serve for neutralizing the alkaline liquor adsorbed by the wool fibers. Oxidizing baths of the acidic type are well known in the art of vat dyeing. A typical oxidizing acid bath, is for instance, an aqueous solution containing 2% acetic acid and 2% ammonium persulfate. Sodium dichromate or other equivalent chemicals may, of course, also be employed in lieu of ammonium persulfate. It will also be understood that in the practice of my invention, neutralization of the alkaline liquor on the wool may be accomplished prior to oxidization of the leuco dye, e. g., by exposure to an acidic fluid.

The following examples will illustrate various procedures, by way of illustration and without intending to limit myself specifically thereto, whereby my invention may be practiced.

EXAMPLE 1

Wool tops of the "worsted" type are conducted into an anthraquinone vat dye bath (leuco form) maintained at pH about 12.9, whose preparation is described below in more detail. The wool tops pass under a roller set beneath the surface of the dye liquor. The diameter of the submerging roller should be large so as to prevent undue tension from developing. The tops are pulled through the bath up a steep incline to the nip of a pair of squeeze rolls. The incline supports the wet top which is rather weak when carrying alkaline liquor. The dye liquor squeezed from the top is allowed to return to the dye bath via a replenishment tank where additions are made to restore the chemical balance of the dye bath. The "tops" are then fed into an acid oxidizing bath in as short a path as practical to prevent subsequent alkali damage. The oxidizing agent serves to fix the reduced dye on the fiber. Excess acid solution is removed by a second set of squeeze rolls and is returned to the oxidizing bath. Following the acid bath, the tops are rinsed and soaped by methods familiar to the trade.

*Preparation of the dye bath*

A dyeing mixture is prepared in the following proportions:

About
Vat Olive T (Prototype 547, C. I. 69526)___percent__ 25
Vat Olive Green B (Prototype 293, C. I. 69501)_do___ 14
Vat Yellow 3R (Prototype 452, C. I. 70805)__do___ 12
Water _____do___ 49

A reducing solution is prepared by preparing a water solution containing 13.5% sodium hydrosulfite and 7.5% caustic soda, which by interaction produces an approximately 20% sodium sulfate solution. The dye is fed into a replenishment tank at a rate of approximately 3 cc. per minute per sliver of wool tops (each sliver weighing about ⅔ oz. per yd.), and the reducing solution is fed into the replenishment tank at a rate of approximately 6 cc. per minute per sliver. The pH is maintained at about 12.9 by controlled addition of a 30% caustic soda solution. After an initial supply of chemicals has been fed into the system from the replenishment tank at a temperature of about 155° F., which corresponds to the temperature of the dye bath, the tops are admitted in the above-described manner. The contact time between the wool and dye bath i. e., from submergence to squeeze roll nip is adjusted by varying the path in the liquid and/or on the incline to 25 seconds.

The acid bath, to which the wool tops are submitted after contact with the alkaline liquor may be at about room temperature, e. g. 75° F. ±5° F. and, in the present example, contains 2% acetic acid and 2% ammonium persulfate.

After customary fulling, a fast shade approximating O. D. #108 is obtained on the wool.

EXAMPLE 2

Example 1 is a repeated by using one or more of the following anthraquinone vat dyes:

Vat Yellow G (C. I. 1118)
Vat Brilliant Yellow 3G (C. I. 1132)
Vat Golden Orange G (C. I. 1096)
Vat Golden Orange RRT (C. I. 1098)
Vat Brilliant Green B (C. I. 1101)
Vat Green 2G (C. I. 1102)
Vat Khaki 2G (Prototype 122, C. I. 71050)
Vat Brown 2G (C. I. 1120)
Vat Olive BA (C. I. 1150)
Vat Brown AG (C. I. 1152)

EXAMPLE 3

Example 1 is repeated at pH 12.4, less cautic soda being used for pH adjustment. The dye consists of Yellow 3RD (Prototype 452, leuco ester of C. I. 70805). The temperature of the alkaline leuco dye bath is adjusted to 140° F. Contact time between wool and alkaline bath is 1 minute. A light orange-yellow shade results.

EXAMPLE 4

Example 3 is repeated at pH 12.95. A deep orange shade results.

EXAMPLE 5

Example 3 is repeated at pH 13 with Olive Green BA (Prototype 293, leuco ester of C. I. 69500) as the dye. A deep olive green shade results. At pH 12.4 a light shade of olive green is obtained. In a further control experiment with the same dye at pH 11.8, a pale olive green shade is produced with the same concentration of dye.

EXAMPLE 6

Example 1 is repeated at pH 13.1; temperature of bath 120° F., time of contact with the wool 10 seconds. The wool tops are carried through the bath on a screen to reduce strain. A shade substantially corresponding to that obtained in Example 1 results.

In a control experiment, Example 1 was repeated, except that the time of exposure of the wool to the alkaline liquor (pH about 12.9) was lengthened to 3 minutes. The wool suffered severe damage, rendering it commercially unacceptable.

The foregoing pH measurements were made electrometrically with a Beckman glass electrode pH meter, which in the alkalinity ranges covered is accurate to approximately pH ±.05.

The four-digit C. I. numbers used herein refer to the Colour Index of the Society of Dyers and Colourists, 1924 and 1928 Supplement; the five-digit C. I. numbers refer to the Colour Index (second edition) of the Society of Dyers and Colourists and the American Association of Textile Chemists and Colorists; and the "Prototype" numbers refer to A. A. T. C. C. Yearbooks 1946 and 1953. I wish it to be understood, however, that the practice of my invention is not limited to those dyes named. but rather includes the dyeing of wool with anthraquinone vat dyes generally, in accordance with the method disclosed.

It will be understood from the foregoing description of the principles of my invention and of several specific examples of the manner of practicing the same (and also of control experiments illustrating practices that should be avoided) that I have provided a process for vat dyeing wool which can be practiced continuously even by relatively unexperienced dyers, and which results in a light-fast and laundry-fast dyed product. Modifications and variations will readily occur to the expert without departing from the spirit of my invention and are encompassed by the scope of the appended claims, which are intended to cover my invention broadly.

I claim:

1. A process of dyeing wool fibers, comprising contacting said wool fibers for a period of from about 10 to about 60 seconds with a bath containing dissolved therein an anthraquinone vat dye, alkali hydrosulfite and caustic alkali, the amount of said caustic alkali being regulated to maintain an electrometrically determined pH value of not less than about 12.8 and not more than about 13.1 in said bath, the temperature of said bath being between about 120° F. and about 160° F., so as to effect deep-dyeing of said wool at its point of maximum affinity for said vat dye and before wool fiber damage occurs at said pH value, and immediately thereafter substantially neutralizing said wool fibers.

2. In the process of claim 1, the step of adjusting the time of contact of said wool fibers with said bath within the range of 10–60 seconds and the temperature of said bath within the range of about 120–160° F., substantially in inverse proportion to the pH of said bath.

3. The process according to claim 1, wherein said wool fibers are in the form of wool tops.

4. In the process according to claim 1, the steps of continuously returning the spent dye solution to a replenishment tank, continuously adding additional vat dye to said replenishment tank, and continuously adjusting the pH of the solution in said replenishment tank to a predetermined value within the range of pH 12.8–13.1.

5. In the process of claim 1, the step of protecting said wool fibers with ethylene dibromide.

6. In the process of claim 1, the step of protecting said wool fibers with formaldehyde.

7. In the process of claim 1, the step of protecting said wool fibers with glyoxal.

8. A process of dyeing wool fibers comprising contacting said wool fibers for a period of about 20–40 seconds with a bath containing dissolved therein an anthraquinone vat dye, alkali hydrosulfite and caustic alkali, the amount of said caustic alkali being regulated to maintain an electrometrically determined pH value of about 12.9 ±.1 in said bath, the temperature of said bath being between about 120° F. and about 160° F., so as to effect deep-dyeing of said wool at its point of maximum affinity for said vat dye and before wool fiber damage occurs at said pH value, and immediately thereafter substantially neutralizing said wool fibers in an acidic oxidizing bath.

References Cited in the file of this patent

UNITED STATES PATENTS

| | | |
|---|---|---|
| 2,508,203 | Weber | May 16, 1950 |
| 2,508,714 | Harris | May 23, 1950 |

OTHER REFERENCES

Amer. Dyestuff Reporter, for Feb. 5, 1951, pp. P78–P83.

Tech. Bulletin, publ. by Du Pont, vol. 4, No. 2, June 1948, pp. 53–61.